US008860315B2

(12) United States Patent
Lee et al.

(10) Patent No.: US 8,860,315 B2
(45) Date of Patent: Oct. 14, 2014

(54) INTEGRATED CIRCUITS, CONTROL METHODS AND LIGHTING SYSTEMS

(75) Inventors: Ching-Tsan Lee, Hsin-Chu (TW); Pai-Feng Liu, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 113 days.

(21) Appl. No.: 13/335,946

(22) Filed: Dec. 23, 2011

(65) Prior Publication Data

US 2012/0161639 A1 Jun. 28, 2012

(30) Foreign Application Priority Data

Dec. 23, 2010 (TW) .............................. 99145445 A

(51) Int. Cl.
*H05B 37/02* (2006.01)
*H05B 37/00* (2006.01)
*H05B 33/08* (2006.01)

(52) U.S. Cl.
CPC ........ *H05B 33/0884* (2013.01); *H05B 33/0887* (2013.01); *Y02B 20/347* (2013.01); *H05B 33/0818* (2013.01)
USPC .......................................... 315/122; 315/192

(58) Field of Classification Search
USPC ................. 315/291, 294, 307, 312, 246, 247, 315/185 R, 185 S
See application file for complete search history.

(56) References Cited

U.S. PATENT DOCUMENTS

| 6,515,434 B1 * | 2/2003 | Biebl ............................ 315/291 |
| 7,675,246 B2 * | 3/2010 | Chiang et al. ................. 315/291 |
| 2009/0167197 A1 * | 7/2009 | Wang et al. ............... 315/185 R |
| 2010/0289735 A1 * | 11/2010 | Hosogi et al. ................. 345/102 |

* cited by examiner

*Primary Examiner* — Minh D A
(74) *Attorney, Agent, or Firm* — Winston Hsu; Scott Margo

(57) ABSTRACT

An integrated circuit is capable of controlling current through several light-emitting diode (LED) chains, each having several LEDs forward-connected in series between a major anode and a major cathode. Each major anode is coupled to a power node. The integrated circuit has several driving circuits, a detection node, a comparator, and a logic controller. The driving circuits can light the LED chains, respectively. Detection voltage at the detection node corresponds to voltage at one of the major cathodes. The comparator asserts a ready signal when the detection voltage exceeds a reference voltage. Receiving a dimming signal and the ready signal, if the dimming signal is asserted and the ready signal has been asserted, the logic controller enables the driving circuits to light the LED chains.

10 Claims, 4 Drawing Sheets

INTEGRATED CIRCUITS, CONTROL METHODS AND LIGHTING SYSTEMS

BACKGROUND OF THE INVENTION

1. Field of the Invention

The present invention relates to integrated circuits, control methods, and related LED lighting systems.

2. Description of the Prior Art

Light-emitting diodes (LEDs) have a very good electro-optical conversion rate, which is higher than fluorescent lamps, cold-cathode fluorescent lamps, and light bulbs. Thus, the current trend is to replace these types of lamps with LEDs. For example, LEDs have already gradually replaced CCFLs as a backlight source in liquid crystal display (LCD) panels.

When using LEDs as a backlight source for an LCD panel, due to the LCD panel's large area, a very large number of LEDs must be used, and these LEDs are normally arranged in chains, each chain driven by a controllable current source. Current flowing through each LED chain is controlled to be the same, so that brightness of all LEDs is approximately the same. If light emitted by each LED is given appropriate propagation, brightness of the LCD panel will be reasonably even.

However, if even one LED out of all LEDs in the LCD panel is short-circuited or open-circuited, the LCD panel brightness will be uneven. Thus, a good LED chain driving circuit should have appropriate sensing circuitry to sense whether any LEDs are open- or short-circuited, and take appropriate preventative measures.

The moment an LED chain driving circuit is connected to power, it is highly probable that, because driving power is not ready, the LED chain driving circuit will determine that the LED chain cannot be driven, which causes an erroneous open-circuit or short-circuit determination, which should be avoided.

SUMMARY OF THE INVENTION

According to an embodiment, an integrated circuit controls currents of a plurality of light-emitting diode (LED) chains. Each LED chain has a plurality of LEDs forward-connected between a major anode and a major cathode. Each major anode is coupled to a power node. The integrated circuit comprises a plurality of driving circuits for individually controlling lighting of the LED chains, a detection node, a comparator, and a logic controller. A sense voltage of the detection node corresponds to a voltage of the major cathodes, and the comparator asserts a ready signal when the sense voltage exceeds a reference voltage. The logic controller receives a dimming signal and the ready signal, and asserts the driving circuits if the ready signal is asserted after the dimming signal is asserted to light the LED chains.

According to an embodiment, a control method is used for controlling currents of a plurality of light-emitting diode (LED) chains. Each LED chain has a plurality of LEDs forward-connected between a major anode and a major cathode. Each major anode is coupled to a power node. The control method comprises receiving a sense voltage corresponding to a voltage of the major cathodes, receiving a dimming signal, comparing the sense voltage and a reference voltage, asserting a ready signal when the sense voltage exceeds the reference voltage, and darkening the LED chains if the ready signal is not asserted after the dimming signal is asserted.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
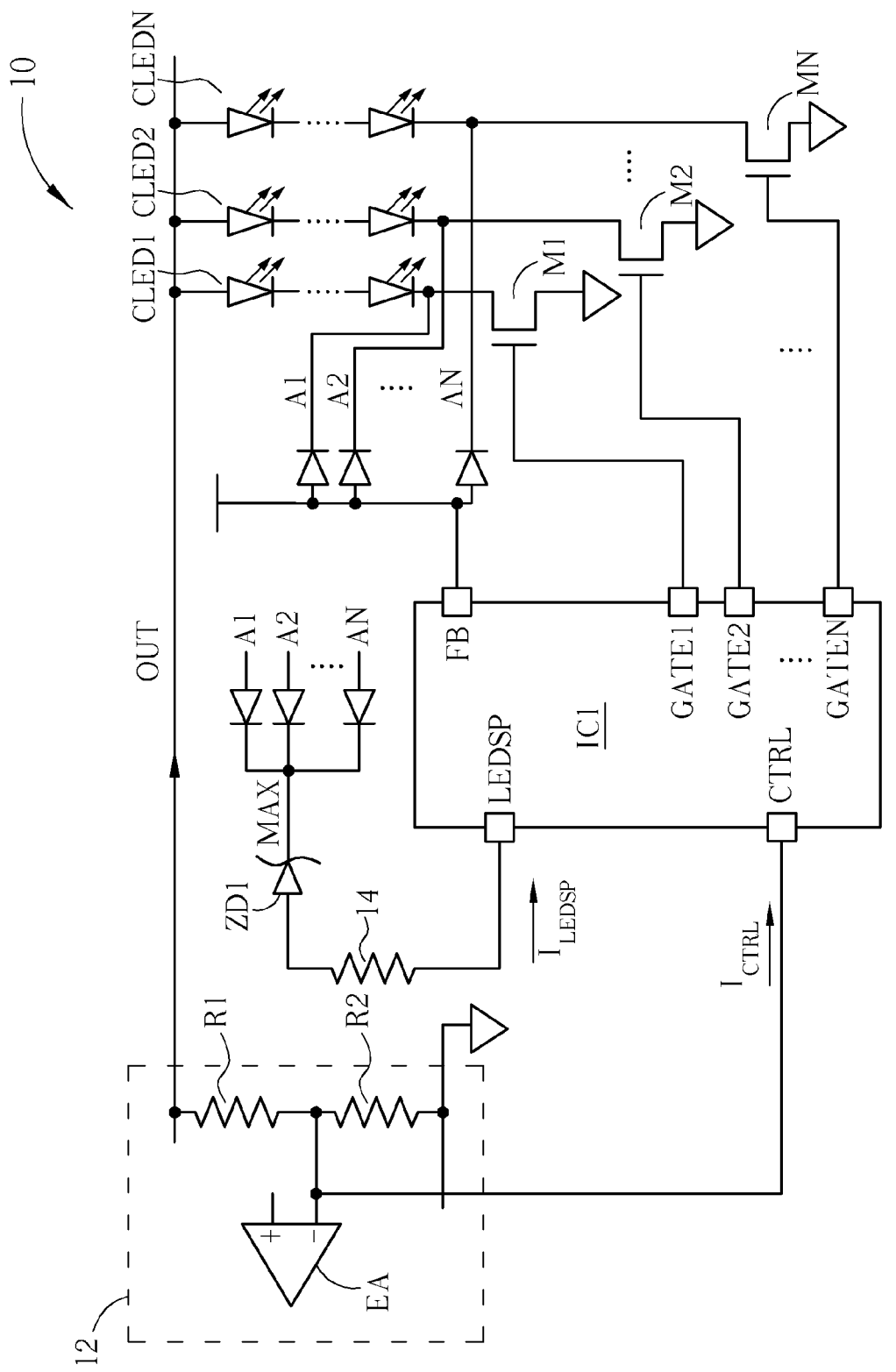
FIG. 1 is a diagram of an LED lighting system.

FIG. 1 is a diagram of LED lighting system 10, which can act as a backlight source of an LCD panel.

Power supply 12 may be a regulator circuit, and provides a power node OUT and a ground node. Voltage $V_{OUT}$ of power node OUT may be as high as 100V. Voltage $V_{OUT}$ is sent to control node of error amplifier EA after being divided by dividing resistors R1, R2. Other circuitry of power supply 12 not shown in FIG. 1 stabilizes voltage at control node of error amplifier EA to a predetermined value, e.g. 2.5V, so as to control voltage $V_{OUT}$.

LEDs acting as a light source are split into N LED chains CLED1 . . . CLEDN. As shown, each LED chain has a plurality of forward-connected LEDs. From top to bottom, the anode of the first LED of each LED chain is defined as a major anode, and the cathode of the last LED is defined as a major cathode. In the following, all LED chains have the same number of LEDs as an example, but in some embodiments, LED chains may have different numbers of LEDs.

All major anodes are coupled to power node OUT. Major cathodes A1 . . . AN each couple to a corresponding power transistor M1 . . . MN. Integrated circuit IC1 controls power transistors M1 . . . MN from corresponding gate nodes GATE1 . . . GATEN to control current flowing through LED chains CLED1 . . . CLEDN. For example, when LEDs are lit, current flowing through each LED chain is controlled to be the same, e.g. 100 mA. When LEDs are not lit, current flowing through each LED chain is the same, e.g. 0 mA. For example, a dimming signal $S_{DIMMING}$ of integrated circuit IC1 is used for determining whether or not LED chains should be lit or unlit.

Integrated circuit IC1 detects voltage on feedback node FB, which may correspond to minimum cathode voltage $V_{A-MIN}$ of major cathodes A1 . . . AN. From circuit connections between feedback node FB and major cathodes A1 . . . AN, it can be seen that voltage $V_{FB}$ at feedback node FB is given by the following equation:

$$V_{FB}=V_{A-MIN}+V_{TH-DIODE}. \quad (1)$$

where $V_{TH-DIODE}$ is forward diode voltage. According to voltage $V_{FB}$, integrated circuit IC1 may provide control current $I_{CTRL}$ to power supply 12 through control node CTRL, thereby adjusting voltage $V_{OUT}$ of power node OUT, so that minimum cathode voltage $V_{A-MIN}$ is held approximately at target value $V_{TAR}$. This target value $V_{TAR}$ may be a constant, e.g. 1V, but may also be a periodically changing value. For example, integrated circuit IC1 may have an output feedback circuit, so that target value $V_{TAR}$ switches between two voltages in response to changes in voltage $V_{FB}$.

Integrated circuit IC1 detects sense voltage $V_{LEDSP}$ of LED short-circuit protection node LEDSP, which may correspond to maximum cathode voltage $V_{A-MAX}$ of major cathodes A1 . . . AN. Cathodes of N diodes couple to common node MAX, and anodes thereof couple to corresponding major cathodes A1 ... AN. Zener diode ZD1 and resistor 14 are series-connected between LED short-circuit protection node LEDSP and common node MAX. From circuit connections between LED short-circuit protection node LEDSP and major cathodes A1 ... AN, it can be seen that sense voltage $V_{LEDSP}$ of LED short-circuit protection node LEDSP is given approximately by the following equations:

$$V_{MAX} = V_{A-MAX} - V_{TH-DIODE}, \quad (2)$$

$$V_{LEDSP} = V_{MAX} - V_{BD-ZD1} - I_{LEDSP} * R_{14}. \quad (3)$$

where $V_{MAX}$ is voltage of common node MAX, $V_{BD-ZD1}$ is breakdown voltage of Zener diode ZD1, $I_{LEDSP}$ is current flowing from LED short-circuit protection node LEDSP into integrated circuit IC1, and $R_{14}$ is resistance of resistor 14.

Through LED short-circuit protection node LEDSP, feedback node FB, and gate nodes GATE1 ... GATEN, integrated circuit IC1 may engage appropriate LED short-circuit or open-circuit protection mechanisms. For example, one open-circuit protection mechanism determines that LED chain CLEDn is open-circuited when a corresponding voltage $V_{GATEn}$ of gate nodes GATE1 ... GATEN has increased to a certain amount and voltage of feedback node FB is consistently lower than target value $V_{TAR}$, and therefore turns off power transistor Mn to stop providing driving current to LED chain CLEDn.

However, the abovementioned open-circuit protection mechanism may make an erroneous determination when LED lighting system 10 has just been connected to power. For example, when LED lighting system 10 has just been connected to power, voltage $V_{OUT}$ of power node OUT may not yet have reached a voltage sufficient to drive LED chains CLED1 ... CLEDN by the time integrated circuit IC1 starts driving LED chains CLED1 ... CLEDN to try to light them. At this time, even if voltages $V_{GATE1}$ ... $V_{GATEN}$ are continuously pulled high, because voltage $V_{OUT}$ is not sufficiently high, voltage of feedback node FB will always be lower than target value $V_{TAR}$, and open-circuit protection mechanism will be activated erroneously.

Figure 2:
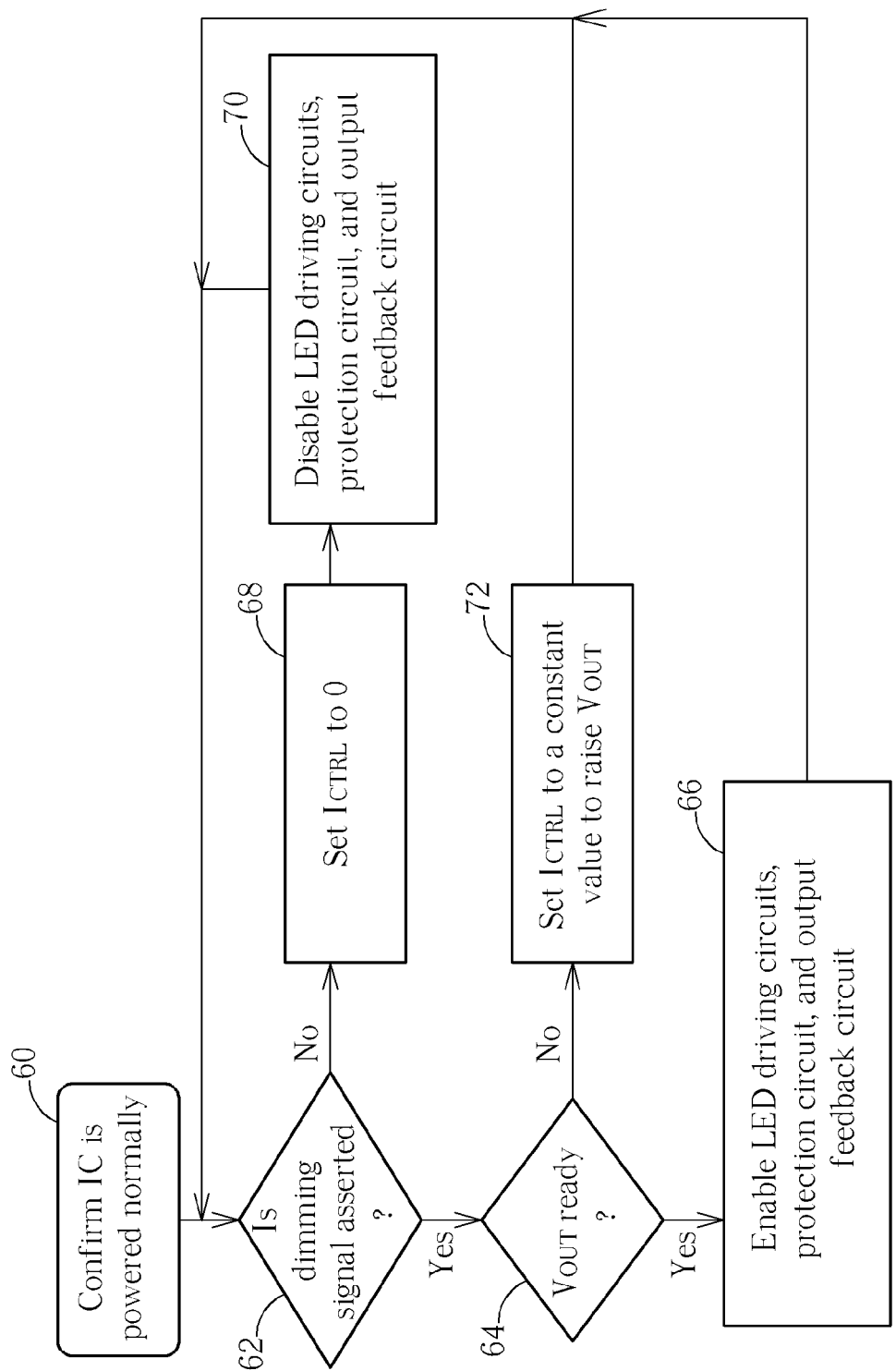
FIG. 2 is a diagram of a control method used in an integrated circuit of FIG. 1.

Thus, protection mechanisms of integrated circuit IC1 are enabled in a specific order. Please refer to FIG. 2, which illustrates a control method used in integrated circuit IC1 of FIG. 1. Step 60 confirms that power is supplied normally to integrated circuit IC1. Step 62 determines whether dimming signal $S_{DIMMING}$ is asserted or deasserted. When dimming signal $S_{DIMMING}$ is deasserted, step 68 causes control node CTRL to have high input impedance, and control current $I_{CTRL}$ to be 0 A. Step 70 disables LED driving circuit, short-circuit/open-circuit protection circuits, and output feedback circuit. Thus, LED chains CLED1 ... CLEDN are all unlit, short-circuit/open-circuit protection circuit does not act, and output feedback circuit does not respond to changes in voltage $V_{FB}$.

When dimming signal $S_{DIMMING}$ is asserted, step 64 determines whether sense voltage $V_{LEDSP}$ of LED short-circuit protection node LEDSP reaches a specific level. If the result in step 64 is "no," this means voltage $V_{OUT}$ is not yet ready. Thus, entering step 72 makes $I_{CTRL}$ a negative value, forcing power supply 12 to increase voltage $V_{OUT}$. If the result in step 64 is "yes," step 66 enables LED driving circuit, short-circuit/open-circuit protection circuit, and output feedback circuit. In this way, LED chains CLED1 ... CLEDN just start being lit; short-circuit/open-circuit protection circuit can follow movement of voltage $V_{FB}$ and sense voltage $V_{LEDSP}$; and output feedback circuit changes target value $V_{TAR}$ according to changes in voltage $V_{FB}$, so that voltage $V_{FB}$ changes within a hysteresis region.

Figure 3:
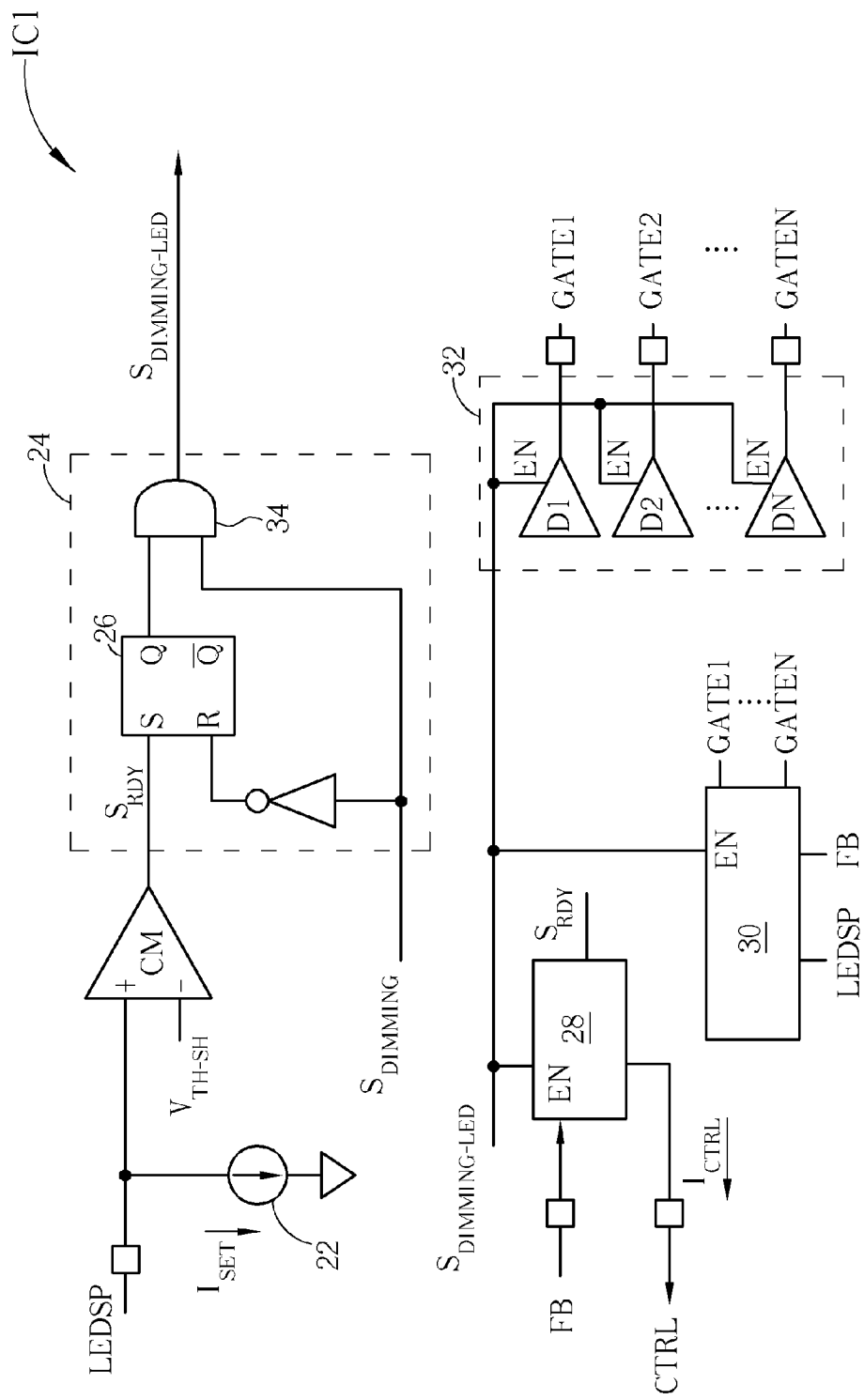
FIG. 3 is a diagram of the integrated circuit of FIG. 1.

FIG. 3 illustrates an example of integrated circuit IC1 of FIG. 1. Assuming LED chains CLED1 ... CLEDN are not yet lit, at this time, current source 22 provides constant current $I_{SET}$. This constant current $I_{SET}$ keeps sense voltage $V_{LEDSP}$ at 0V while voltage $V_{MAX}$ of common node MAX is not sufficiently high, which is lower than reference voltage $V_{TH-SH}$, so that ready signal $S_{RDY}$ remains in deasserted state. Only when voltage $V_{MAX}$ exceeds breakdown voltage $V_{BD-ZD1}$ of Zener diode ZD1, will sense voltage $V_{LEDSP}$ start rising. By appropriately selecting current $I_{SET}$, breakdown voltage $V_{BD-ZD1}$, and resistance $R_{14}$ of resistor 14, it can be seen that, according to equations (2) and (3), when sense voltage $V_{LEDSP}$ exceeds reference voltage $V_{TH-SH}$, levels of voltage $V_{MAX}$ and maximum cathode voltage $V_{A-MAX}$ may be used to determine that voltage $V_{OUT}$ is ready. So, when sense voltage $V_{LEDSP}$ exceeds reference voltage $V_{TH-SH}$, comparator CM asserts ready signal $S_{RDY}$. When ready signal $S_{RDY}$ and dimming signal $S_{DIMMING-LED}$ are both deasserted, output feedback circuit 28 causes control current $I_{CTR}$ to be a negative value (flowing into integrated circuit IC1), so that voltage $V_{OUT}$ rises.

Logic controller 24 has SR flip-flop 26 and AND gate 34. It can be seen from circuitry of logic controller 24 that when dimming signal $S_{DIMMING}$ is deasserted, dimming signal $S_{DIMMING-LED}$ is also deasserted, so driving circuit 32, short-circuit/open-circuit protection circuit 30, and output feedback circuit 28 are disabled. When dimming signal $S_{DIMMING}$ is asserted, logic controller 24 needs to confirm that ready signal $S_{RDY}$ is asserted before enabling dimming signal $S_{DIMMING-LED}$, so that driving circuit 32 starts driving LED chains CLED1 ... CLEDN to emit light; short-circuit/open-circuit protection circuit 30 begins responding to sense voltage $V_{FB}$, voltage $V_{LEDSP}$, and voltages of gate nodes GATE1 ... GATEN; and output feedback circuit 28 starts controlling control current $I_{CTRL}$ according to voltage $V_{FB}$.

Figure 4:
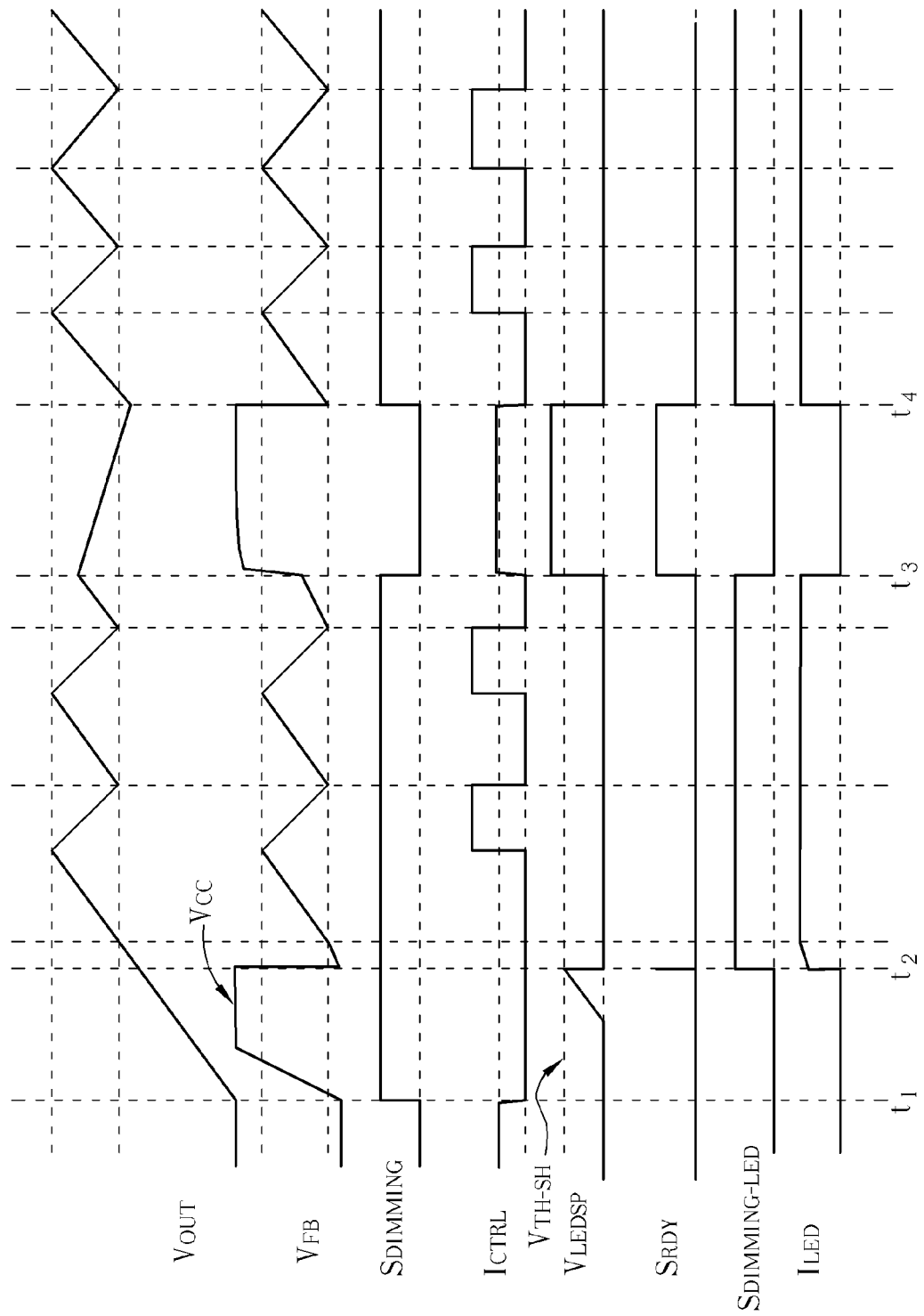
FIG. 4 is one possible signal waveform of FIG. 3.

FIG. 4 illustrates one possible signal waveform of FIG. 3. From top to bottom, signals include voltage $V_{our}$ of power node OUT, voltage $V_{FB}$ of feedback node FB, dimming signal $S_{DIMMING}$, control current $I_{CTRL}$ of control node CTRL, sense voltage $V_{LEDSP}$, ready signal $S_{RDY}$, dimming signal $S_{DIMMING-LED}$, and current $I_{LED}$ flowing through one of LED chains CLED1 ... CLEDN. Prior to time $t_1$, voltage $V_{our}$ is not yet ready, and integrated circuit IC1 has not driven LED chains CLED1 ... CLEDN, so current $I_{LED}$ is 0.

At time $t_1$, dimming signal $S_{DIMMING}$ changes state to asserted. At this time, because sense voltage $V_{LEDSP}$ is lower than reference voltage $V_{TH-SH}$, ready signal $S_{RDY}$ and dimming signal $S_{DIMMING-LED}$ are both kept deasserted, so that driving circuit 32, short-circuit/open-circuit protection circuit 30, and output feedback circuit 28 are all disabled. Deasserted ready signal $S_{RDY}$ and dimming signal $S_{DIMMING-LED}$ force control current $I_{CTR}$ to be a negative value, so that control node of error amplifier EA goes low, and voltage $V_{OUT}$ starts to rise. Although voltage $V_{FB}$ rises with rising voltage $V_{OUT}$, because diode coupled to feedback node FB is reverse biased, voltage $V_{FB}$ will only rise at most to voltage $V_{CC}$. When voltage $V_{OUT}$ rises to a specific level, sense voltage $V_{LEDSP}$ also starts to rise.

When sense voltage $V_{LEDSP}$ rises to reference voltage $V_{TH-SH}$ (as shown by time $t_2$ of FIG. 4), ready signal $S_{RDY}$ changes state to asserted, and thereby causes dimming signal $S_{DIMMING-LED}$ to change state to asserted, so that driving circuit 32, short-circuit/open-circuit protection circuit 30, and output feedback circuit 28 are all enabled. Enabled driving circuit 32 begins causing LED chains CLED1 ... CLEDN to emit light, and current $I_{LED}$ approaches a constant current value, so that voltage $V_{FB}$ and sense voltage $V_{LEDSP}$ both drop. Dropping sense voltage $V_{LEDSP}$ causes ready signal $S_{RDY}$ to change states to deasserted. At this time, both inputs of SR flip-flop 26 are 0, so output of SR flip-flop 26 and dimming signal $S_{DIMMING-LED}$ are unaffected.

As shown in FIG. 4, from time $t_2$ to time $t_3$, enabled output feedback circuit 28 periodically switches control current $I_{CTRL}$ between a positive value and a negative value, so that voltage $V_{OUT}$ and voltage $V_{FB}$ generate periodic change. For example, voltage $V_{FB}$ periodically changes from 1V to 1.5V with a frequency that can be less than 20 Hz.

At time $t_3$, dimming signal $S_{DIMMING}$ changes state to deasserted, so that dimming signal $S_{DIMMING-LED}$ changes to deasserted, simultaneously disabling driving circuit 32, short-circuit/open-circuit protection circuit 30, and output feedback circuit 28. Control current $I_{CTR}$ and current $I_{LED}$ are both 0 at this time. Disabled driving circuit 32 causes both voltage $V_{FB}$ and sense voltage $V_{LEDSP}$ to rise, so that ready signal $S_{RDY}$ changes state to asserted. Voltage $V_{OUT}$ may gradually fall based on response speed of power supply 12.

At time $t_4$, dimming signal $S_{DIMMING}$ changes state to asserted. At this time, because ready signal $S_{RDY}$ is already asserted, dimming signal $S_{DIMMING-LED}$ immediately changes state to asserted, and starts causing LED chains CLED1 . . . CLEDN to emit light.

LED lighting system 10 of FIG. 1 may be modified to only include one of Zener diode ZD1 and resistor 14.

In another embodiment, output feedback circuit controls target value $V_{TAR}$ according to changes in voltage $V_{FB}$, to that voltage $V_{FB}$ is approximately fixed at a predetermined value.

It can be seen from FIG. 3 and FIG. 4 that, even if dimming signal $S_{DIMMING}$ is asserted, integrated circuit IC1 must wait until ready signal $S_{RDY}$ is asserted, i.e. voltage $V_{OUT}$ reaches a certain level, before starting to drive LED chains CLED1 . . . CLEDN. This prevents driving LED chains CLED1 . . . CLEDN when voltage $V_{OUT}$ is insufficient, which would cause an erroneous determination that LED chains CLED1 . . . CLEDN have an open circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An integrated circuit for controlling currents of a plurality of light-emitting diode (LED) chains, each LED chain having a plurality of LEDs forward-connected between a major anode and a major cathode, each major anode coupled to a power node, the integrated circuit comprising:
   a plurality of driving circuits for individually controlling lighting of the LED chains;
   a detection node, of which a sense voltage corresponds to a voltage of the major cathodes;
   a comparator for asserting a ready signal when the sense voltage exceeds a reference voltage; and
   a logic controller for receiving a dimming signal and the ready signal, and asserting the driving circuits to light the LED chains if the ready signal is asserted after the dimming signal is asserted.

2. The integrated circuit of claim 1, wherein an output voltage control signal is asserted to raise voltage of the power node when the ready signal is deasserted after the dimming signal is asserted.

3. The integrated circuit of claim 1, wherein the sense voltage corresponds to a maximum voltage of the major cathodes.

4. The integrated circuit of claim 1, further comprising:
   a protection circuit for providing open-circuit or short-circuit protection of the LED chains;
   wherein the logic controller enables the protection circuit when the ready signal is asserted after the dimming signal is asserted.

5. The integrated circuit of claim 1, further comprising:
   an output feedback circuit for periodically asserting or deasserting an output voltage control signal to raise or lower voltage of the power node;
   wherein the logic controller enables the output feedback circuit when the ready signal is asserted after the dimming signal is asserted.

6. A control method used for controlling currents of a plurality of light-emitting diode (LED) chains, each LED chain having a plurality of LEDs forward-connected between a major anode and a major cathode, each major anode coupled to a power node, the control method comprising:
   receiving a sense voltage corresponding to a voltage of the major cathodes;
   receiving a dimming signal;
   comparing the sense voltage and a reference voltage;
   asserting a ready signal if the sense voltage exceeds the reference voltage; and
   darkening the LED chains if the ready signal is not asserted after the dimming signal is asserted.

7. The control method of claim 6, further comprising:
   darkening the LED chains when the dimming signal is deasserted.

8. The control method of claim 6, further comprising:
   enabling an output voltage control signal to raise voltage of the power node if the ready signal is not asserted after the dimming signal is asserted.

9. The control method of claim 6, wherein the sense voltage corresponds to a maximum voltage of the major cathodes.

10. The control method of claim 6, further comprising:
    disabling an open-circuit or short-circuit protection mechanism of the LED chains if the ready signal is not asserted after the dimming signal is asserted; and
    periodically raising or lowering voltage of the power node if the ready signal is asserted after the dimming signal is asserted.

* * * * *